United States Patent [19]

Andou et al.

[11] Patent Number: 5,297,585
[45] Date of Patent: Mar. 29, 1994

[54] ROOM TEMPERATURE SHRINKABLE TUBE

[75] Inventors: Hiroyuki Andou; Norio Adachi; Osamu Miyata, all of Oita, Japan

[73] Assignee: Nishi Nippon Electric Wire & Cable Co. Ltd., Oita, Japan

[21] Appl. No.: 871,404

[22] Filed: Apr. 21, 1992

[30] Foreign Application Priority Data

Apr. 24, 1991 [JP] Japan .................. 3-059317[U]

[51] Int. Cl.$^5$ .............................................. F16L 47/00
[52] U.S. Cl. ................................... 138/103; 138/109; 138/110; 138/177; 138/178; 174/DIG. 8; 428/34.9; 29/450
[58] Field of Search ............... 138/103, 108, 110, 109, 138/177, 178; 29/450, 235, 447; 428/34.9; 174/DIG. 8

[56] References Cited

U.S. PATENT DOCUMENTS

| | | | |
|---|---|---|---|
| 4,003,122 | 1/1977 | Overmyer et al. | 29/450 |
| 4,232,712 | 12/1980 | Squires | 428/34.9 |
| 4,332,849 | 6/1982 | Barkus et al. | 174/DIG. 8 |
| 4,506,430 | 3/1985 | Guzay | 29/450 |
| 4,573,251 | 3/1986 | Hillyard | 29/450 |
| 4,717,608 | 1/1988 | Meltsch | 428/34.9 |
| 4,789,164 | 12/1988 | Winter et al. | 174/DIG. 8 |
| 4,879,799 | 11/1989 | Sovistt et al. | 174/DIG. 8 |
| 5,070,597 | 12/1991 | Holt et al. | 138/103 |
| 5,098,752 | 3/1992 | Chang et al. | 428/34.9 |

*Primary Examiner*—James E. Bryant, III
*Attorney, Agent, or Firm*—Thomas R Morrison

[57] ABSTRACT

A room-temperature shrinkable tube includes an elastic tube stretched to cover a cylindrical shell. An object to be coated by the elastic tube is inserted into the cylindrical shell, and the cylindrical shell is slid out from the elastic tube, so that the resilience of the elastic tube brings it into contact with the surface of the object.

4 Claims, 1 Drawing Sheet

ROOM TEMPERATURE SHRINKABLE TUBE

BACKGROUND OF THE INVENTION

The present invention relates to room temperature shrinkable tubes, more particularly, to a room temperature shrinkable tube to cover a joint fitting of a coaxial cable and a joint of an electric wire, cable or the like.

In the prior art, a heat shrinkable tube, which is shrunk by a heating, is used for the above purposes.

Therefore, in the prior art, a heat source such as, for example, a gas torch or an electric heater, is required. The need for such equipment is troublesome. In addition, skilled workers are required to heat shrink the tube.

OBJECT AND SUMMARY OF THE INVENTION

An object of the present invention is to provide a room temperature shrinkable tube that overcomes the drawbacks of the prior art.

Briefly stated, the present invention provides room-temperature shrinkable tube that includes an elastic tube stretched to cover a cylindrical shell. An object to be coated by the elastic tube is inserted into the cylindrical shell, and the cylindrical shell is slid out from the elastic tube, so that the resilience of the elastic tube brings it into contact with the surface of the object.

The invention uses an appropriately long cylindrical shell with a space through the center, which has a flange at the end. The cylindrical shell is covered with an appropriately long elastic tube whose diameter is enlarged to be bigger than that of the cylindrical shell. The unstretched diameter of the elastic tube is smaller than that of the cylindrical shell. A stopper, with a flange, is attached inside the inner wall at the other end of the cylindrical shell.

The cylindrical shell is actuated as a spacer to hold the diameter of elastic tube in its stretched condition. The flange portion is used as a handle to pull the cylindrical shell from the enlarged elastic tube.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
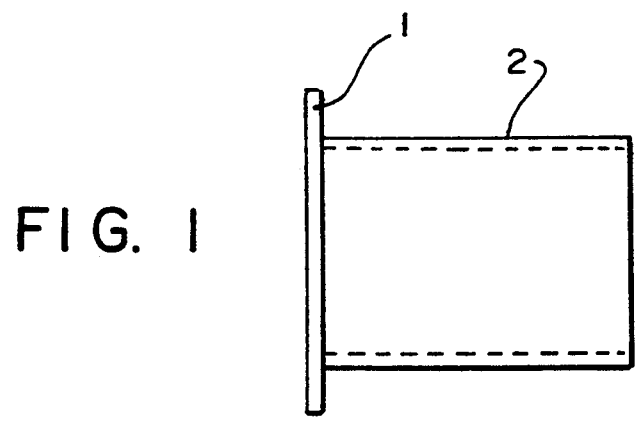
FIG. 1 is a side view of a cylindrical shell of an embodiment of the present invention.
Figure 2:
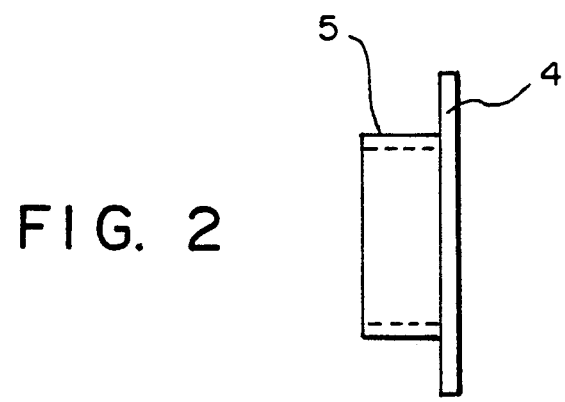
FIG. 2 is a side view of a stopper of an embodiment of the present invention.

The present invention is explained with an accompanying drawings for an embodiment. An appropriately long cylindrical shell 2 with a space through the center has a flange 1 at the end. A stopper 5 has a cylindrical portion fitted inside cylindrical shell. A flange 4 of stopper 5 abuts the end of cylindrical shell 2. Cylindrical shell 2 and stopper 5 can be made of any convenient material such as, for example, rigid vinyl, or polyethylene.

An appropriately long elastic tube 3 is expanded beyond its normal diameter to fit over cylindrical shell. Elastic tube may be made of any appropriate elastic material such as, for example, natural rubber or ethylenepropylene rubber.

When the elastic tube 3 is longer than the cylindrical shell 2, elastic tube can be wrinkled to adjust its length to fit between the flanges 1 and 4.

Figure 3:
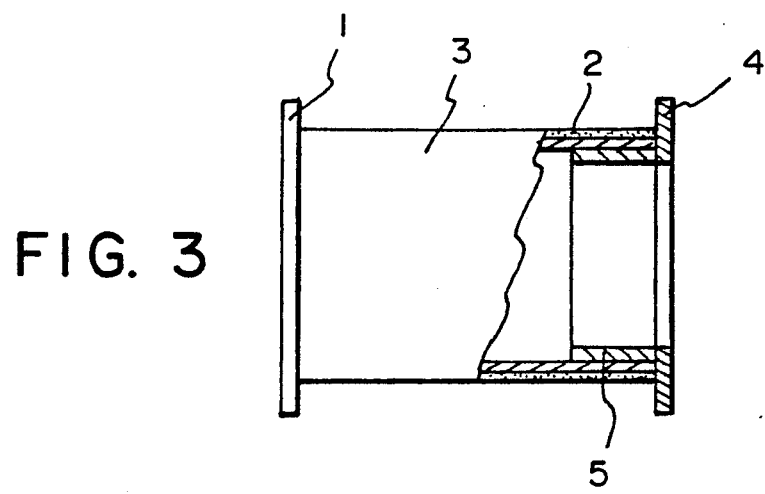
FIG. 3 is a partial broken side view of an embodiment of the present invention.

To make the assembly shown in FIG. 3, the diameter of the elastic tube 3 is enlarged mechanically and the cylindrical shell 2 is inserted into the enlarged elastic tube 3. After the mechanical enlargement is ended, elastic tube shrinks into contact with the surface of cylindrical shell 2.

In use, a metal fitting on a coaxial cable that needs to be covered with the elastic tube 3, is inserted in the cylindrical shell 2. The stopper 5 is pulled from the cylindrical shell 2 while holding the enlarged elastic tube 3 and grasping the flange 1 by hand. The cylindrical shell 2 is then pulled from the enlarged elastic tube 3 so that elastic tube 3 is permitted to shrink further upon the surface of the metal fitting of the coaxial cable is covered with the shrunk.

Removal of the cylindrical shell 2 from the elastic tube 3 may be facilitated by spreading a lubricant such as silicone grease or the like on the outer surface of the cylindrical shell. This makes it relatively easy to pull the enlarged elastic tube 3 from the cylindrical shell 2 to improve operation efficiency.

Since the present invention constructed as above can be used without the need for a heat resource such as a gas torch, a dryer or the like, it is much easier to use than heat-shrinkable materials of the prior art. Moreover, since skilled labor is not necessary, even unskilled workers can make a covering with the same quality. Therefore, the present invention is a valuable addition to industrial techniques.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A room temperature shrinkable tube apparatus comprising:

an cylindrical shell with a space through the center;

said cylindrical shell having a flange at a first end thereof;

an elastic tube covering said cylindrical shell;

said elastic tube having an inner diameter with an unstretched inner diameter dimension that is smaller than an outer diameter of said cylindrical shell;

said inner diameter being enlarged to fit said elastic tube on said cylindrical shell;

said elastic tube being removable from said cylindrical shell by means of sliding said elastic tube on an outer diameter surface of said cylindrical shell;

said elastic tube having an elasticity at room temperature such that said inner diameter returns to said unstretched inner diameter dimension when said elastic tube is removed from said cylindrical shell;

a stopper having first and second ends;

said stopper having a flange at said first end thereof; and said second end of said stopper being fitted in said space in said cylindrical shell.

2. Apparatus according to claim 1, wherein said cylindrical shell includes means for permitting said elastic tube to be slid therefrom onto an object passing through said space, said elastic tube including sufficient resilience to engage said object, whereby an elastic coating is formed thereon.

3. An apparatus according to claim 1, wherein said means for permitting includes a lubricant between said elastic tube and said cylindrical shell.

4. An apparatus for shrinking a cover on an object, comprising:

a cylindrical shell;

a flange at a first end of said cylindrical shell;

a space through a center of said cylindrical shell;

said space being large enough to permit passage of said object therethrough;

a stopper;

a flange at a first end of said stopper;

said stopper being fitted into a second end of said cylindrical shell;

an elastic tube on said cylindrical shell;

said elastic tube having an unstretched diameter small enough to engage a surface of said object;

said elastic tube being stretched to fit upon said cylindrical shell;

said elastic tube being removable from said cylindrical shell by means of sliding said elastic tube on an outer diameter surface of said cylindrical shell;

said elastic tube having an elasticity at room temperature such that said inner diameter returns to said unstretched inner diameter dimension when said elastic tube is removed from said cylindrical shell; and a lubricant on said cylindrical shell, said lubricant being effective for enabling said elastic tube to be slid off said cylindrical shell onto said object.

* * * * *